United States Patent
Krishnamurthy

(10) Patent No.: US 9,042,476 B2
(45) Date of Patent: May 26, 2015

(54) METHODS AND A DEVICE FOR MULTI-RESOLUTION PRECODING MATRIX INDICATOR FEEDBACK

(71) Applicant: Google Technology Holdings LLC, Mountain View, CA (US)

(72) Inventor: Sandeep H. Krishnamurthy, Mountain View, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/034,828

(22) Filed: Sep. 24, 2013

(65) Prior Publication Data

US 2015/0030092 A1    Jan. 29, 2015

Related U.S. Application Data

(60) Provisional application No. 61/858,805, filed on Jul. 26, 2013.

(51) Int. Cl.
  *H04B 7/02*    (2006.01)
  *H04L 1/02*    (2006.01)
  *H04B 7/04*    (2006.01)

(52) U.S. Cl.
  CPC ............ *H04B 7/0456* (2013.01); *H04B 7/0421* (2013.01)

(58) Field of Classification Search
  CPC ..... H04L 1/0618; H04L 1/06; H04L 27/2647; H04L 7/042; H04L 27/2662; H04W 16/28; H04B 7/0669

USPC .......... 375/267, 316, 324, 340, 347; 370/334; 455/101
See application file for complete search history.

(56) References Cited

U.S. PATENT DOCUMENTS

| | | | |
|---|---|---|---|
| 2011/0200081 A1 | 8/2011 | Guo et al. | |
| 2011/0255635 A1* | 10/2011 | Lee et al. | 375/295 |
| 2012/0082192 A1* | 4/2012 | Pelletier et al. | 375/219 |
| 2012/0175314 A1 | 7/2012 | Ciampi et al. | |
| 2012/0257568 A1* | 10/2012 | Cai et al. | 370/328 |
| 2012/0314590 A1 | 12/2012 | Choudhury et al. | |

FOREIGN PATENT DOCUMENTS

EP    2442509 A1    4/2012

OTHER PUBLICATIONS

NEC Group: "DL MU-MIMO Enhancement Schemes", 3GPP TSG-RAN WG1 Meeting #72, R1-130364, St Julian's, Malta, Jan. 28-Feb. 1, 2013, all pages.
NEC Group: "Evaluation Results for DL MU-MIMO Enhancement Schemes", 3GPP TSG-RAN WG1 Meeting #72, R1-130713, St. Julian's, Malta, Jan. 28-Feb. 1, 2013, all pages.

(Continued)

*Primary Examiner* — Ted Wang
(74) *Attorney, Agent, or Firm* — Faegre Baker Daniels LLP

(57) ABSTRACT

Disclosed are methods and a device for Multi-resolution PMI Feedback. In one implementation, a user equipment finds a rank 1 or rank 2 Precoding Matrix Indicator based on the signal channel matrix and interference covariance matrix, defines an error vector, obtains an orthonormal basis for the projection matrix, finds the (M−1)-dimensional vector from a codebook (e.g., oversampled Discrete Fourier Transform) with the minimum Euclidean distance, and sends a feedback representing to the base station regarding the vector that it found in the codebook.

25 Claims, 5 Drawing Sheets

(56) References Cited

OTHER PUBLICATIONS

QUALCOMM, Alcatel-Lucent, et al: "Way Forward on MU-CQI", 3GPP TSG RAN WG1 #73, R1-132733, Fukuoka, Japan, May 20-24, 2013, Agenda item: 6.2.2.2, all pages.

Intel Corporation, Hitachi, Pantech: "WF on MU-SCI", TSG-RAN WG1 Meeting #73, R1-132737, Fukuoka, Japan, May 20-24, 2013, Agenda Item: 6.2.2.2, Documents for Discussion and Decision, all pages.

LG Electronics, ZTE, St-Ericsson, Ericsson: "Way Forward on MU-CSI", 3GPP TSG RAN WG1 #73, R1-132746, Fukuoka, May 20-24, 2013, Agenda item: 6.2.2.2, all pages.

Patent Cooperation Treaty, "PCT Search Report and Written Opinion of the International Searching Authority" for International Application No. PCT/US2014/048032 (GP-102417) dated Nov. 6, 2014, 13 pages.

Sohn, I. and Andrews, J.G., "Approaching Large-System Limits Faster in Multiuser MIMO with Adaptive Channel Feedback Adjustments" IEEE Communications Letters, vol. 14, No. 12, Dec. 1, 2010, pp. 1125-1127.

3GPP TSG RAN WG1 #73, R1-131913, "Remaining details of MU-CSI" Intel Corporation, Fukuoka, Japan, May 20-24, 2013, 4 pages.

3GPP TSG RAN WG1 #73, R1-131928, "Consideration regarding additional information for new aperiodic PUSCH feedback mode" Fujitsu, Fukuoka, Japan, May 20-24, 2013, 6 pages.

* cited by examiner

METHODS AND A DEVICE FOR MULTI-RESOLUTION PRECODING MATRIX INDICATOR FEEDBACK

TECHNICAL FIELD

The present disclosure is related generally to wireless network communications and, more particularly, to channel quality feedback schemes in wireless networks.

BACKGROUND

During the course of recent Third Generation Partnership Project ("3GPP") Long Term Evolution ("LTE") standards-setting discussions, members have made several proposals for improving Multi-User Multiple-Input Multiple-Output ("MU-MIMO") scheduling efficiency. These proposals can be categorized as follows.

Option 1: The evolved Node B ("eNB") configures multiple Channel State Information ("CSI") processes with suitable rank restrictions.

Option 1-1: The eNB configures two CSI processes. The first process has a codebook subset restriction that restricts the User Equipment ("UE") to feed back the best rank 1 Precoding Matrix Indicator ("PMI") and Channel Quality Indicator ("CQI"). The second CSI process has a codebook subset restriction that restricts the UE to feedback the best rank 2 PMI and CQI.

Option 1-2: The eNB targets the first CSI process towards Single-User MU-MIMO (no codebook subset restriction). The eNB targets the second CSI process towards MU-MIMO (rank 1 codebook subset restriction).

Option 2: The UE selects the best desired PMI and the best companion PMI corresponding to a co-scheduled user.

Option 2-1: The UE selects the desired PMI and the co-scheduled user PMI jointly such that the desired Signal to Interference plus Noise Ratio ("SINR") or sum-rate is maximized. This option has a high implementation complexity.

Option 2-2: The UE adopts a suboptimal approach in which it selects the best desired PMI and then selects a companion PMI that leads to the smallest co-scheduled user interference. This option has a lower implementation complexity.

Option 3: The UE determines a Multi-User Channel Quality Indicator ("MU-CQI") corresponding to K>1 (e.g., K=5) companion PMIs. The UE must evaluate a MU-CQI corresponding to each of the multiple companion PMI hypotheses. The UE draws the companion PMI hypotheses from a codebook subset that is either signaled or specified, so that the elements of the subset have a column space that is (quasi-) orthogonal to the column space of the desired precoder.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
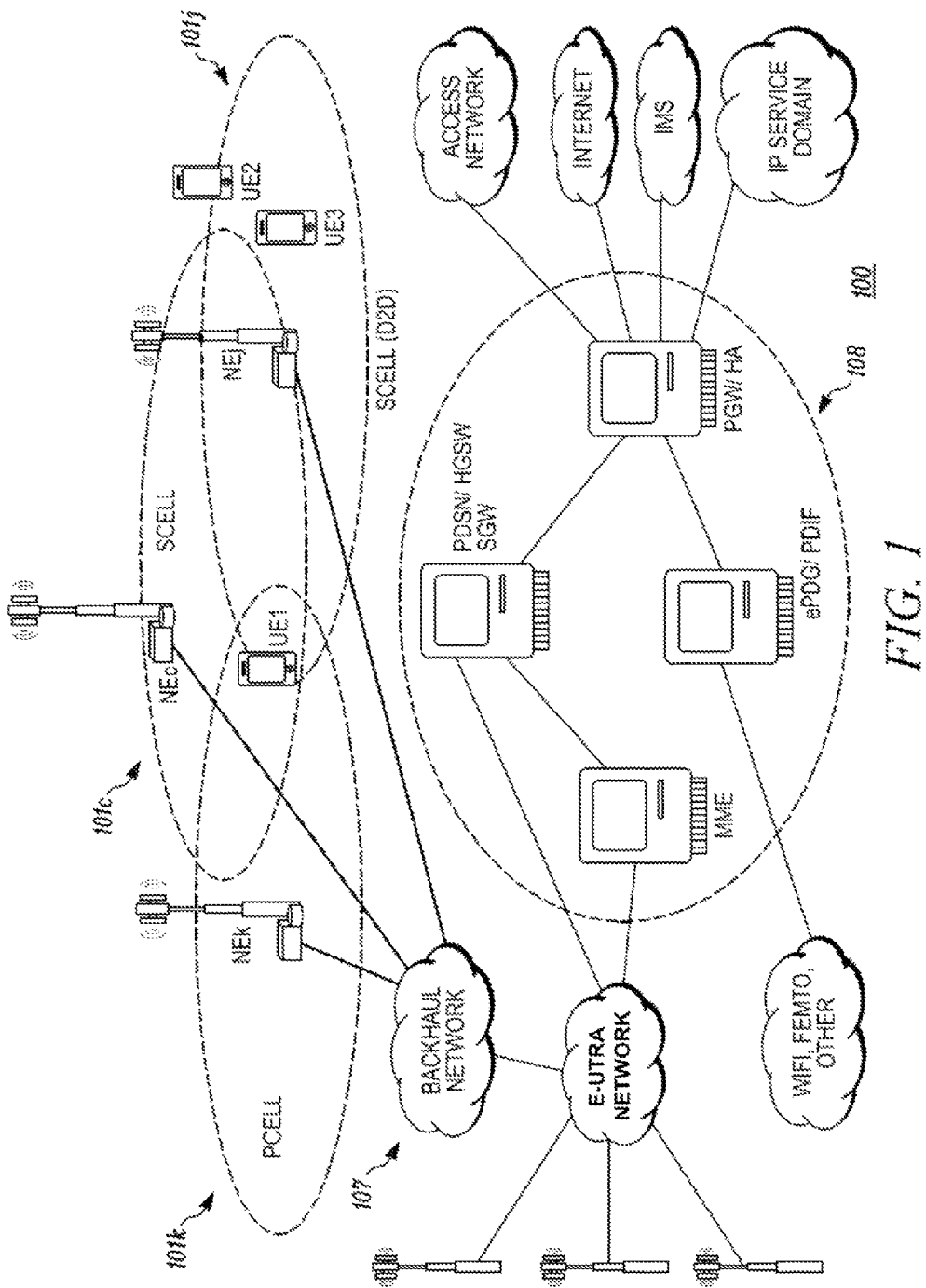
FIG. 1 is an overview of a representative communication system in which the methods of this disclosure may be practiced.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

If the 3GPP adopts a method for enhancing MU-MIMO scheduling efficiency that increases the number of bits required for CSI feedback, then it should endeavor to make the best possible use of those extra bits. This disclosure sets forth a device and methods for enhancing PMI and MU-CQI feedback that uses the additional feedback bits in an efficient manner.

In one embodiment, the UE computes the projection of the error vectors along the best direction $e_{k,1}{}^H \overline{v}_{k,1}$, $e_{k,2}{}^H \overline{v}_{k,1}$ with respect to the chosen Single-User Multiple-Input Multiple-Output ("SU-MIMO") PMI $\overline{v}_{k,1}$ and sends information regarding this projection to the eNB.

In another embodiment, the UE sends, back to the eNB, information pertaining to the projections $e_{k,1}{}^H \overline{v}_{l,1}$ and $e_{k,2}{}^H \overline{v}_{l,1}$ for a one or more hypotheses on $\overline{v}_{l,1}$. The UE can explicitly feed information pertaining to the projection $\overline{v}_{k,2}{}^H \overline{v}_{l,1}$ for different hypotheses on $\overline{v}_{l,1}$ back to the eNB.

Referring to FIG. 1, the representative wireless communication network 100 is configured to use one or more radio access technologies, examples of which include an Evolved Universal Terrestrial Radio Access ("E-UTRA"), Institute of Electrical and Electronics Engineers ("IEEE") 802.11, and IEEE 802.16. The network 100 includes a first cell 101k, a second cell 101j, and a third cell 101c. First cell 101k is managed by a first Network Entity ("NE") NEk, second cell 101j is managed by NEj, and third cell 101c is managed by NEc. Possible implementations of cells 101k, 101j, and 101c include a macrocell, a femtocell, a picocell, and a wireless access point.

Also shown in FIG. 1 are UE1, UE2, and UE3. Each of the UEs is in communication with the network 100 via one or more of the network entities, either in an active mode or an idle mode. Possible implementations of a UE include a mobile phone, a tablet computer, a laptop, and a machine-to-machine device.

Communication between a network entity and a UE typically occurs when the UE is located within the network entity's cell. For example, each of NEk, NEj, and NEc can transmit signals to and receive signals from UE1. NEj would typically communicate with UE2 and UE3.

The term "cell" refers either to the geographical area covered by a network entity or to the network entity itself. The context in which the term is used indicates its meaning. For example, when a UE is said to be transmitting to a cell, it means that the UE is transmitting to the network entity that controls the cell. When a UE is said to be in a cell, the term "cell" refers to the geographical area. In the geographical sense, a sector is a type of cell.

A "virtual cell" is a cell that is created as a result of multiple network entities cooperating. A UE generally does not perceive any distinction between a virtual cell and a non-virtual cell.

The term "network entity" as used herein refers to hardware and software that operates as part of the infrastructure of a network. Examples include an E-UTRA base station, an eNB, a transmission point, a remote radio head, a home eNB, a relay node, an IEEE 802.11 access point, and an IEEE 802.16 base station.

A network entity can be made of multiple network entities. For example, two base stations can operate in conjunction with one another to operate as a single network entity.

A network entity can be a sub-portion of another network entity. For example, a base station (a type of network entity) can control multiple cells, each of which is controlled by certain resources of the base station. Each set of resources (e.g., each antenna array along with the equipment that controls it) can be a separate network entity.

In some embodiments of the disclosure, a single network entity controls two or more of the cells of FIG. 1. In some embodiments, multiple network entities coordinate with one another, e.g., when using Carrier Aggregation or coordinated multipoint communication.

The cells, network entities, and UEs of FIG. 1 are only representative and are intended to facilitate description. In fact, the network 100 likely has many cells and network entities and is in communication with many UEs. For example, if the network 100 is an LTE network, it includes many eNBs that control many macrocells. Many users move within and between those macrocells, and the mobile devices of the users frequently connect to one or more of the macrocells.

Referring still to FIG. 1, the network 100 also includes a backhaul network 107. The backhaul network 107 includes wired and wireless infrastructure elements that carry signals around various parts of the network 100 and among the cells. Examples of infrastructure elements include fiber optic lines and wireless microwave links. The network 100 also includes a core network 108 that controls the operation of the network 100 using various resources, including billing systems, home location registers, and Internet gateways. In an LTE implementation, resources of the core network 108 communicate with network entities over an E-UTRA network. The core network resources also communicate with other networks.

Figure 2:
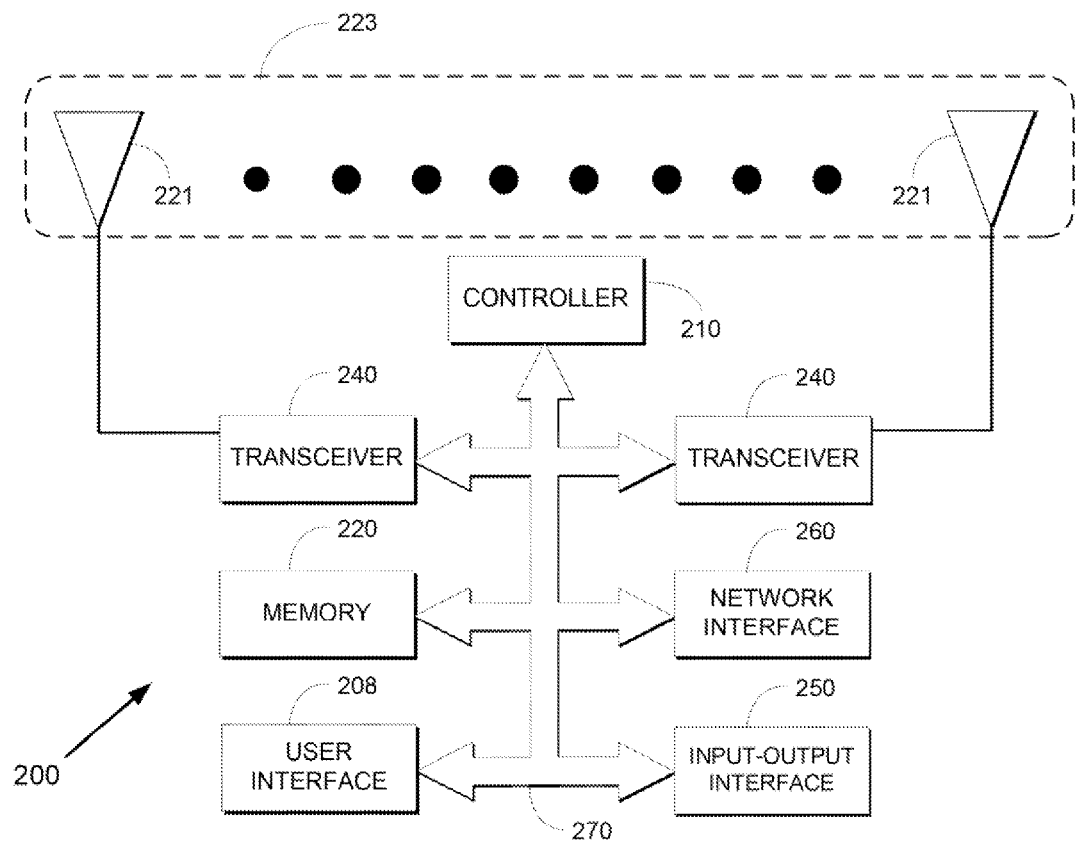
FIG. 2 is a generalized schematic of a representative network entity or UE.

FIG. 2 illustrates a configuration of a network entity or a UE (from FIG. 1) in accordance with an embodiment of the disclosure. The network entity or UE ("the device 200") includes a user interface 208, a controller 210, a memory 220 (which can be implemented as volatile memory or non-volatile memory), one or more transceivers 240, an input/output ("I/O") interface 250, a network interface 260, and one more antennas 221. Each of these elements is communicatively linked to one another via one or more data pathways 270.

Possible implementations of the data pathways 270 include wires, conductive pathways on a microchip, and wireless connections. Possible implementations of the controller 210 include a microprocessor and a computer. Possible implementations of the network interface 260 include a modem, a network interface card, and a wireless local area network chipset.

During operation of the device 200, each transceiver 240 receives data from the controller 210 and transmits Radio Frequency ("RF") signals representing the data via an antenna 221 connected to it. Similarly, each transceiver 240 receives RF signals via the antenna 221, converts the signals into the appropriately formatted data, and provides the data to the controller 210.

The controller 210 retrieves instructions and data from the memory 220 and, using the instructions and data, provides outgoing data to, or receives incoming data from, the transceivers 240. The controller 210 also receives data from, and sends data to, external devices via the I/O interface 250.

If the device 200 is a network entity, the network interface 260 is coupled to a backhaul interface. In such a case, the controller 210 transmits data to other network entities of the network 100 (FIG. 1) via the network interface 260.

According to an embodiment of the disclosure, the antennas 221 belong to a set 223 of geographically collocated or proximal physical antenna elements. Each of the antenna elements has one or more transmitters and one or more receivers. In one embodiment, the device 200 supports MIMO communication.

In Release 11 ("Rel-11"), the eNB performs MU-MIMO scheduling based on SU-MIMO feedback. The UE picks a wideband PMI that corresponds to the best rank (under the configured codebook subset restriction that is applicable to the CSI process)+CQI and reports it to the eNB. In Release 12 ("Rel-12"), with the introduction of Physical Uplink Shared CHannel ("PUSCH") 3-2 mode, the UE sends both wideband and subband PMI back to the eNB using either the Release 8 ("Rel-8")/Release 10 ("Rel-10") codebook or the Rel-12 codebook. Additionally, the UE reports the associated CQI. For $N_R=2$ receive antennas, the PMI chosen by the UE corresponds to either rank 1 or rank 2 if there is no codebook subset restriction. The PUSCH 3-2 feedback mode may be augmented by a MU-CQI (e.g., Option 2 or Option 3 above) if such feedback is adopted by the Radio Access Network Working Group 1.

Suppose that the eNB employs $N_T=4$ antennas and performs MU-MIMO scheduling. The MU-MIMO scheduler can pick up to four users for co-scheduling over a Physical Resource Block ("PRB") group such that the scheduler maximizes the multi-user sum rate. In many implementations, the scheduler is a hybrid SU/MU-MIMO scheduler, which co-schedules UEs only if doing so achieves a sum rate that is better relative to SU-MIMO.

In this disclosure, we consider the case where at most two UEs are co-scheduled on a PRB group. Two co-scheduled UEs is typically the upper limit due to the fact that SU-MIMO PMI feedback is imperfect, and the eNB may need to rely on spatial multi-user interference suppression at the UE receiver with two receive antennas. This is because perfect Zero Forcing ("ZF") or Block Diagonalization cannot be implemented with quantized PMI feedback.

Further, we assume that the eNB schedules only one layer per co-scheduled UE. This assumption is based on the practical limits of an LTE Rel-11 system. Thus, if a UE reports PMI/CQI under rank 2, the eNB performs a rank override (i.e., transmits signals at a lower rank than what is reported by the UE) and attempts to signal in a direction and with a rate related to the SU-MIMO PMI/CQI feedback.

Suppose that the eNB is attempting to pair user k and user l such that $1 \le k, l \le K$ where K is the number of UEs in the cell. Suppose that $v_k$ and $v_m$ are the optimal rank 1 signaling directions for the two users based on the SU-MIMO PMI/CQI feedback (possibly with rank override). Also suppose that the effective channels for the two users post-receive filtering can be written as:

$$H_{eff} = \begin{bmatrix} g_k^H H_k \\ g_l^H H_l \end{bmatrix}$$

where $g_l^H$ and $g_l^H$ are the receive filters determined at the UE based on Maximal Ratio Combining ("MRC"), ZF, or Minimum Mean Squared Error ("MMSE") criterion, and $H_k$ and $H_l$ are the $N_R \times N_T$ channel matrices.

The eNB attempts to obtain an estimate of the effective channel based on SU-MIMO feedback as:

$$H_{\mathit{eff}} \approx \hat{H}_{\mathit{eff}} = \underbrace{\begin{bmatrix} d_k & 0 \\ 0 & d_l \end{bmatrix}}_{=D} \underbrace{\begin{bmatrix} v_k^H \\ v_l^H \end{bmatrix}}_{=CH}$$

where $|d_k|^2$ and $|d_l|^2$ are each a user Signal-to-Noise Ratio ("SNR") derived from the SU-MIMO CQI report.

The eNB applies a ZF precoder W based on the estimated effective channel $\hat{H}_{\mathit{eff}}$ such that $\mathrm{tr}(WW^H) \le 1$ so as to reduce the Multiple Access Interference ("MAI") as seen from each UE's receiver. The ZF precoder can be expressed as:

$$W = C(C^H C)^{-1},$$

which results in perfect diagonalization or zero MAI if the PMI feedback is perfect. However, the PMI feedback is quantized (often to four bits/wideband and an additional four bits/subband under PUSCH 3-2 mode), resulting in imperfect ZF that leads to non-zero MAI.

After some simplification, the ZF precoding matrix can be written as:

$$W = \frac{1}{\sqrt{2(1-|\alpha|^2)}} [\, v_k - \alpha^* v_l \quad v_l - \alpha v_k \,],$$

where $\alpha = v_k^H v_l$.

The UE feeds back SU-MIMO CQI under the assumption that the eNB signals on the chosen best direction. However, ZF leads to signaling for each user along a direction related to, but not the same as, the chosen best direction. Therefore, the eNB must take the SNR degradation due to forced ZF into account while allocating rate for each co-scheduled user. Under the perfect PMI and the assumption that the UE employs a ZF receiver, the post-receive processing SINR is given by $\gamma_k = 0.5\,(1-|\alpha|^2)|d_k|^2$ and $\gamma_l = 0.5(1-|\alpha|^2)|d_l|^2$ for the two users respectively.

However, under quantized PMI feedback, the eNB can still attempt to estimate the post-receive processing SINR under different receiver assumptions (MRC, ZF, MMSE, etc.) and allocate rate based on that. Suppose that the ZF precoder is designed based on quantized PMI:

$$W = \frac{1}{\sqrt{2(1-|\bar{\alpha}|^2)}} [\, \bar{v}_k - \bar{\alpha}^* \bar{v}_l \quad \bar{v}_l - \bar{\alpha}\bar{v}_k \,],$$

where $\bar{v}_k$ and $\bar{v}_l$ denote the quantized PMI for the two users respectively, and where $\bar{\alpha} = \bar{v}_k^H \bar{v}_l$.

Suppose that using singular value decomposition we can write down the channel matrices of the two users as $H_k = U_k \Sigma_k V_k^H$ and $H_l = U_l \Sigma_l V_l^H$ respectively, where:

$U_k, U_l$ are $N_T \times N_R$ matrix with orthonormal columns,
$V_k, V_l$ are $N_R \times N_R$ matrix with orthonormal columns, and
$\Sigma_k, \Sigma_l$ are $N_R \times N_R$ diagonal matrices.

Under perfect PMI/CQI feedback and with MRC/ZF/MMSE demodulation, it can be shown that the chosen PMI by user k corresponds to the strongest singular vector of $V_k$ for rank 1 feedback and two strongest singular vectors for rank 2 feedback. Therefore, the two strongest singular vectors assuming $N_R = 2$ can be written down as a function of the reported PMI as $v_{k,1} = \bar{v}_{k,1} - e_{k,1}$ and $v_{k,2} = \bar{v}_{k,2} + e_{k,2}$ respectively where:

$\bar{v}_{k,1}$ and $\bar{v}_{k,2}$ correspond to quantized PMI and
$e_{k,1}$ and $e_{k,2}$ correspond to the residual error vector.

The signal received at user k can therefore be written as:

$$H_k W \begin{bmatrix} s_k \\ s_l \end{bmatrix} = U_k \Sigma_k Q_k \begin{bmatrix} s_k \\ s_l \end{bmatrix},$$

where $Q_k = V_k^H W$ and $$\begin{bmatrix} s_k \\ s_l \end{bmatrix}$$

is the signal vector that corresponds to the Multi-Level Quadrature Amplitude Modulation ("M-QAM") modulated symbols meant for the two users.

We can further simplify $Q_k$ as:

$$Q_k = \begin{bmatrix} a & b \\ c & d \end{bmatrix} = \frac{1}{\sqrt{2(1-|\bar{\alpha}|^2)}} \begin{bmatrix} v_{k,1}^H(\bar{v}_{k,1} - \bar{\alpha}^* \bar{v}_{l,1}) & v_{k,1}^H(\bar{v}_{l,1} - \bar{\alpha}\bar{v}_{k,1}) \\ v_{k,2}^H(\bar{v}_{k,1} - \bar{\alpha}^* \bar{v}_{l,1}) & v_{k,2}^H(\bar{v}_{l,1} - \bar{\alpha}\bar{v}_{k,1}) \end{bmatrix}.$$

The post-receive processing SNR for user k that employs MMSE receiver can be estimated by the eNB as:

$$\gamma_k^{(MMSE)} = \frac{1}{\left[ |d_k|^2 Q_k^H \overset{2}{\underset{k}{\Sigma}} Q_k + I_{N_R} \right]^{-1}_{(1,1)}} - 1,$$

which is clearly a function of a, b, c, and d.

Note that the total transmit power is normalized to unity (i.e., $E[\mathrm{Tr}(H_k W W^H H_k^H)] \le 1$ and the reported CQI corresponds to a SNR equal to $|d_k|^2$. Therefore, the noise variance is set to $|d_k|^{-2}$. Since the eNB does not have detailed information regarding the covariance matrix structure, it assumes spatially white interference covariance and sets the interference covariance to $(1/|d_k|^2)I_{N_R}$ for the purpose of estimating UE post-processing SINR towards rate allocation. Similar expressions can be derived under MRC or ZF processing at the UE.

Since the eNB does not know all of the terms needed for computing the a-d parameters, it is possible to bound them based on the SU-MIMO feedback and the codebook distance properties. Additionally, the UEs can provide information that can help in computing these parameters to the eNB. For example, the a-d parameter can be written as:

$$a = \frac{1}{\sqrt{2(1-|\bar{\alpha}|^2)}} (1 - |\alpha|^2 + e_{k,1}^H \bar{v}_{k,1} - \bar{\alpha}^* e_{k,1}^H \bar{v}_{l,1})$$

$$b = \frac{1}{\sqrt{2(1-|\bar{\alpha}|^2)}} (e_{k,1}^H \bar{v}_{l,1} - \bar{\alpha} e_{k,1}^H \bar{v}_{k,1})$$

-continued $$c = \frac{1}{\sqrt{2(1-|\overline{\alpha}|^2)}}(e_{k,1}^H \overline{v}_{l,1} - \overline{\alpha}^* v_{k,2}^H \overline{v}_{l,1} - \overline{\alpha}^* e_{k,2}^H \overline{v}_{l,1})$$

$$d = \frac{1}{\left(\sqrt{2(1-|\overline{\alpha}|^2)}\right)}(\overline{v}_{k,2}^H \overline{v}_{l,1} + e_{k,2}^H \overline{v}_{l,1} - \overline{\alpha} e_{k,2}^H \overline{v}_{k,1}).$$

In matrix form, this dependence can be expressed as:

$$\begin{bmatrix} a \\ b \\ c \\ d \end{bmatrix} = A \underbrace{\begin{bmatrix} e_{k,1}^H \overline{v}_{k,1} \\ e_{k,2}^H \overline{v}_{k,1} \end{bmatrix}}_{x_1} + B \underbrace{\begin{bmatrix} e_{k,1}^H \overline{v}_{l,1} \\ \overline{v}_{k,2}^H \overline{v}_{l,1} \\ e_{k,2}^H \overline{v}_{l,1} \end{bmatrix}}_{x_2},$$

where A and B are two suitable coefficient matrices.

To enhance UE feedback according to an embodiment of the disclosure, two approaches can be considered: Multi-Resolution Desired PMI and Multi-Resolution Companion PMI.

In Multi-Resolution Desired PMI, the UE computes the projection of the error vectors along the best direction $e_{k,1}^H \overline{v}_{k,1}, e_{k,2}^H \overline{v}_{k,1}$ with respect to the chosen SU-MIMO PMI $\overline{v}_{k,1}$ and sends information regarding this projection to the eNB.

In Multi-Resolution Companion PMI, the UE sends information pertaining to the projections $e_{k,1}^H \overline{v}_{l,1}$ and $e_{k,2}^H \overline{v}_{l,1}$ for a one or more hypotheses on $\overline{v}_{l,1}$, back to the eNB. In one implementation, the UE sends explicit information pertaining to the projection $\overline{v}_{k,2}^H \overline{v}_{l,1}$ for different hypotheses on $\overline{v}_{l,1}$ back to the eNB. Another implementation avoids such explicit feedback by restricting the UE to reporting rank 2 PMI. With this restriction, the UE must report $\overline{v}_{k,2}$ (i.e., the second quantized direction orthogonal to $\overline{v}_{k,1}$) to the eNB so that the eNB can compute $\overline{v}_{k,2}^H \overline{v}_{l,1}$ for different hypotheses on $\overline{v}_{l,1}$. On the other hand, if the UE reports only the first quantized direction $\overline{v}_{k,1}$ (i.e., rank 1 PMI), the UE will need to report $\overline{v}_{k,2}^H \overline{v}_{l,1}$ for different hypotheses on $\overline{v}_{l,1}$.

The projection operations of the previous subsection can be decomposed into norm and direction feedback as follows.

For the Multi-Resolution Desired PMI, the UE can break down the processing into the following steps:

Step 1. Compute best desired direction $\overline{v}_{k,1}$.

Step 2. Compute the residue vector $e_{k,1} = v_{k,1} - \overline{v}_{k,1}$, where $v_{k,1}$ is based on the estimated channel matrix.

Step 3. Compute the Residual Channel Quality Indicator ("R-CQI") that corresponds to the squared norm of the residue $r_{k,1}^2 := \|e_{k,1}\|_2^2$. For reporting R-CQI by the UE to a eNB, a quantized value of R-CQI can be selected by the UE from a table. In one embodiment, the table can comprise a set of squared norm values on the dB scale, i.e., $10 \log_{10} r_{k,1}^2$ such as $\{0, -1, -2, \ldots, -8, -\text{Inf}\}$ dB, where each value in the table can be represented as a 3-bit field, and where −Inf is the encoding used for squared norm that is below −8 dB.

Step 4. Compute the best direction for the residue by the maximization $$\max_{f \in CB(1)} |e_{k,1}^H f|$$

where CB(1) is the rank 1 codebook. Alternatively, CB(1) can be a subset of the rank 1 codebook such that the codewords are (quasi-)orthogonal to the chosen $\overline{v}_{k,1}$. The UE can obtain these codewords by referencing a pre-determined look up table. Alternatively, the eNB can send a look-up table to the UE through Radio Resource Control ("RRC") signaling at the beginning of the data session, and the UE can make use of this look up table for CB(1). UE feeds back the Residue direction Precoding Matrix Indicator ("R-PMI"). In one embodiment, the UE can select the R-PMI to represent the direction vector that satisfies $$f_{k,1} := \arg\max_{f \in CB(1)} |e_{k,1}^H f|.$$

Step 5: Repeat steps 2 through 4 for the residue vector $e_{k,2} = v_{k,2} - \overline{v}_{k,2}$, where $v_{k,2}$ is based on the estimated channel matrix. Compute the R-CQI that corresponds to the squared norm of the residue $r_{k,2}^2 := \|e_{k,2}\|_2^2$. Compute the best direction for the residue by the maximization $$\max_{f \in CB(1)} |e_{k,2}^H f|$$

where CB(1) is a subset of the rank 1 codebook as before. In one embodiment, the UE can select the residue direction vector as $$f_{k,2} := \arg\max_{f \in CB(1)} |e_{k,2}^H f|.$$

For the Multi-Resolution Companion PMI, the UE can perform the following additional processing.

Step 6. Compute the "new" error vectors $\tilde{e}_{k,1} := v_{k,1} - \overline{v}_{k,1}$ and $\tilde{e}_{k,2} := v_{k,2} - \overline{v}_{k,2}$, where $\overline{v}_{k,1} := \text{norm}(\overline{v}_{k,1} + \overline{r}_{k,1} \hat{f}_{k,1})$, $\overline{v}_{k,2} := \text{norm}(\overline{v}_{k,2} + \overline{r}_{k,2} \hat{f}_{k,2})$, and $\text{norm}(x) := x/\|x\|_2$. Compute the projections $\tilde{e}_{k,1}^H \overline{v}_{l,1}$ and $\tilde{e}_{k,2}^H \overline{v}_{l,1}$ for M (>=1) different hypotheses on $\overline{v}_{l,1}$ where $\overline{v}_{l,1}$ that can be chosen from a rank 1 codebook with entries that are (quasi-)orthogonal to $\overline{v}_{k,1}$ and $\overline{v}_{k,2}$.

Step 7. Compute the angles $\theta_{k,1}^{(1,1)} := \text{angle}(\tilde{e}_{k,1}^H \overline{v}_{l,1})$ and $\theta_{k,1}^{(2,1)} := \text{angle}(\tilde{e}_{k,1}^H \overline{v}_{l,1})$ and send a quantized version of the angles to the eNB.

If the UE feeds back only the multi-resolution desired PMI and not the companion PMI information, certain bounds or conditional expectations can be used to derive the a, b, c, d parameters.

These solutions (Multi-Resolution Desired PMI or Multi-Resolution Companion PMI) can be applied to one CSI process or to multiple CSI processes. Furthermore, they can be used with rank 1 or rank 2 codebook subset restrictions. Suppose that the eNB has configured two CSI processes. The first CSI process has no codebook subset restriction, and the UE reported feedback can be used for SU-MIMO scheduling. The second CSI process has a rank 1 codebook subset restriction and additionally, the eNB signals a field to indicate that the UE must report rank 1 PMI plus the error vector norm and direction for the principal signaling direction (Solution 1). Alternatively, the eNB signals a field to indicate that the UE must report rank 1 PMI, the error vector normal and direction for the principal signaling direction, the norm and angles for the projection of the error vector on at least M (>=1) different hypotheses on co-scheduled user principal direction. Such signaling can be part of the CSI process configuration signaling or embedded within dedicated configuration signaling (e.g., RRC).

According to an embodiment of the disclosure, the eNB can achieve improved ZF based on multi-resolution PMI. To do so, the eNB first improves the estimate of the effective channel as:

$$\hat{H}_{\text{eff}} = \begin{bmatrix} d_k & 0 \\ 0 & d_l \end{bmatrix} \begin{bmatrix} \bar{v}_k^H + \bar{e}_k^H \\ \bar{v}_l^H + \bar{e}_l^H \end{bmatrix}.$$

The improved ZF precoder then becomes $$\tilde{W} = \frac{1}{\sqrt{2(1-|\tilde{\alpha}|^2)}} [\tilde{v}_k - \tilde{\alpha}^* \tilde{v}_l \tilde{v}_l - \tilde{\alpha} \tilde{v}_k],$$

where $\tilde{v}_{k,1} = \text{norm}(\tilde{v}_{k,1} + \tilde{e}_{k,1}) = \text{norm}(\tilde{v}_{k,1} + \tilde{r}_{k,1} \hat{f}_{k,1})$, $\tilde{r}_{k,1}$ is the quantized R-CQI for user k, $\hat{f}_{k,1}$ is the quantized R-PMI for user k, and norm $(x) := x/\|x\|_2$. This is similarly the case for $\tilde{v}_l$ and where $\tilde{\alpha} = \tilde{v}_k^H \tilde{v}_l$.

The eNB can then compute the a, b, c, d parameters based on the improved ZF precoder and with Multi-Resolution Desired PMI or Multi-Resolution Companion PMI. Thus, both the ZF precoding and rate allocation can be made more accurate.

The benefits of Multi-Resolution Desired PMI, Multi-Resolution Companion PMI, and Improved ZF Based on Multi-resolution PMI include: (1) better user orthogonality (as seen from the UE receivers) due to more accurate direction feedback, (2) better UE pairing decisions, (3) better SU/MU dynamic switching, and (4) better eNB estimates of the post-receive SINR (which improves rate allocation by the scheduler).

Multi-Resolution Desired PMI is sufficient for improved ZF precoder construction. However, Multi-Resolution Companion PMI can additionally help improve rate allocation.

To provide error vector encoding according to one embodiment, a UE:

(1) Finds a rank 1 or rank 2 PMI based on the signal channel matrix and interference covariance matrix. Suppose that p is the desired quantized direction (based on a codebook) and v is the unquantized direction. For rank 1, p is the desired PMI. For rank 2, p corresponds to the direction (normalized unit vector) associated with the larger CQI;

(2) Defines the error vector as $e = v - p$;

(3) Obtains an orthonormal basis $L_Z$ for the projection matrix $Z = I - pp^H$;

(4) Finds the (M−1)-dimensional vector $\hat{u}$ from the codebook C (e.g., oversampled Discrete Fourier transform ("DFT") codebook) with the minimum Euclidean distance such that $$\hat{u} = \underset{u \in C}{\arg\min} \|e - L_z u\|_2;$$

and (5) Sends a B-bit feedback representing $\hat{u}$.

Currently, methods for improving MU-MIMO scheduling efficiency do not take into account the interference spatial selectivity that is typically exploited by Minimum Mean Squared Error Interference Rejection Combining ("MMSE-IRC") receivers. This disclosure presents a method to address this problem.

In one method, the eNB configures the UE within a single Channel State Information Reference Signal ("CSI-RS") process to provide feedback of either SU-MIMO CSI (PMI, CQI, or Rank Indication ("RI")). Alternatively, the UE sends a quantized version of the dominant eigenvector of the channel transmit covariance matrix, where the combined set of vectors from rank 1 and rank 2 codebooks are used for feedback.

In another method, the UE selects the best rank 2 (or rank 4) precoder matrix. It then selects the best column within that precoder matrix—one that is relevant for rank 1 transmission. The UE then feeds the matrix and the column back to (identifies them for) the eNB.

Suppose that the eNB transmits a single stream to user k. The received signal vector at user k can be written as: $y_k = H_k p_k s_k + z_k$, where $p_k$ is the precoding vector used for modulating a M-QAM symbol $s_k$ and $z_k$ is the interference and noise process.

For Demodulation Reference Signal ("DM-RS") transmissions, the MMSE-IRC filter can be written as:

$$g_k^H = p_k^H H_k^H (H_k p_k p_k^H H_k^H + R_{z_k})^{-1} = (1 + p_k^H H_k^H R_{z_k}^{-1} H_k p_k)^{-1} p_k^H H_k^H R_{z_k}^{-1}.$$

In other words, MMSE-IRC receiver can be viewed as a composition of three steps:

(1) spatial whitening operation on the received signal vector $R_{z_k}^{-1} y_k$, (2) spatial matched filter $p_k^H H_k^H (R_{z_k}^{-1} y_k)$, and (3) normalization, i.e., multiplication by the scalar $(1 + p_k^H H_k^H R_{z_k}^{-1} H_k p_k)^{-1}$.

If the eNB employs rank 1, 2, etc., transmission with a precoding matrix $P_k$, the mean squared error matrix for a MMSE receiver can be written as:

$$MSE_k = (I + P_k^H H_k^H R_{z_k}^{-1} H_k P_k)^{-1}.$$

For a rank v transmission, maximizing the mutual information under a MMSE-IRC receiver is equivalent to minimizing the product $MSE_{k,(1,1)} \ldots MSE_{k,(v,v)}$ where v is the transmission rank. If the selection of $P_k$ is unconstrained, a necessary condition for minimizing the product metric is to select $P_k$ such that $P_k = U_k \Sigma_k$, where $U_k$ is the matrix comprising the L dominant eigenvectors of the matrix $R_{H_k} := H_k^H R_{z_k}^{-1} H_k$ and $\Sigma_k$ is a diagonal matrix with non-negative entries.

Another existing Multi-User Channel State Information ("MU-CSI") method proposes selecting a rank 1 vector $p_k$ such that the metric trace $(p_k^H H_k^H H_k p_k)$ or $\text{trace}(p_k^H E[H_k^H H_k] p_k)$, where the expectation is performed over the subband (and one or more subframes) of interest, is maximized. If $p_k$ is unconstrained, the trace metric is maximized if $p_k$ is selected to be the principal eigenvector of $H_k^H H_k$ or $E[H_k^H H_k]$. This does not necessarily correspond to the optimal signaling direction for rank 1 transmission to user k equipped with MMSE-IRC receiver. A more appropriate criterion would be to select $p_k$ that maximizes trace $(p_k^H H_k^H R_{z_k}^{-1} H_k p_k)$ or $\text{trace}(p_k^H E[H_k^H R_{z_k}^{-1} H_k] p_k)$.

If the interference comprises a rank 1 signal (from the dominant co-channel interferer) plus noise, the interference covariance matrix can be written as $R_{z_k} = \sigma_1^2 I + H_k^{(I)} p_k^{(I)}$. From matrix inversion lemma:

$$R_{z_k}^{-1} = \sigma_1^{-2} (I - h_k^{(I)} h_k^{(I)*}/(\sigma^2 + \|h_k^{(I)}\|^2))$$

where $h_k^{(I)} := H_k^{(I)} p_k^{(I)}$. Therefore, when the residual noise power $\sigma_1^2$ tends to zero, spatial whitening operation simply projects the received signal to the space orthogonal to the interference vector.

In another existing method for iterative downlink interference alignment ("DIA") for an M×M MIMO link in a 2-cell system, the signal vector received by user k in cell α can be written as:

$$y_k = H_{\alpha k} P(v_{\alpha 1}\chi_{\alpha 1} + \ldots + v_{\alpha S}\chi_{\alpha S}) + G_{\alpha k} P(v_{\beta 1}\chi_{\beta 1} + \ldots + v_{\beta S}\chi_{\beta S}) z_k,$$

where the UE is located in the network such that it can hear two base stations α (serving base station) and β (neighbor base station). Both base stations co-schedule S<M users in their own cells using a cascade of a fixed precoder P (common to both base stations) and cell-specific precoders $V_\alpha := [v_{\alpha 1}, \ldots, v_{\alpha S}]$ and $V_\beta := [v_{\beta 1}, \ldots, v_{\beta S}]$, respectively.

In general, the steps taken for downlink interference alignment are as follows:

1. The UE receiver of user k applies a linear ZF that projects the received signal into the nullspace of the co-channel interference subspace (the interference subspace is estimated through neighbor channel estimation and through the knowledge of the neighbor cell precoder covariance matrix). Alternatively, an MMSE spatial filter can be used. If ZF is used, the user k applies the transformation $u_{\alpha k}^H y_k$ where $u_{\alpha k}^H$ is chosen to be in the left nullspace of $G_{\alpha k} P$.

2. The UE receiver feeds back the effective channel $u_{\alpha k}^H H_{\alpha k} P$ to the serving base station.

3. The base station α performs ZF beamforming by setting $V_\alpha = (H_{eff,\alpha}^H H_{eff,\alpha})^{-1} H_{eff,\alpha}^H$, where:

$$H_{eff,\alpha}^H = \begin{bmatrix} u_{\alpha_1}^H H_{\alpha 1} P \\ \vdots \\ u_{\alpha S}^H H_{\alpha S} P \end{bmatrix}.$$

It has been observed that this method provides gains only when the dominant cell interference (arising from cell β) is much stronger than the residual co-channel interference. When the residual co-channel interference has comparable power relative to the neighbor cell interference, the ZF method leads to a loss as it does not provide beamforming gain. Therefore, in an MMSE version of the above procedure, the UE and base station iterate feedback and precoding operations respectively.

The principle behind downlink interference alignment is the idea that all of the co-channel interference (from one or more cells) is restricted to an (M-S)-dimensional subspace allowing each cell to perform ZF precoding for S users in an S-dimensional subspace. Further, using a ZF or MMSE receive filter, each UE restricts the co-channel+Multi-User ("MU") interference to a (M-1)-dimensional subspace. Step 2 above can be accomplished with finite-bit UE feedback by using a codebook (such as Rel-8 4Tx codebook or Rel-10 8 Tx codebook).

Setting the receive filter to the dominant eigenvector (same as matched filter) of the transmit covariance matrix $H_k^H H_k$ leads to a substantial loss relative to ZF interference alignment. Therefore, in multi-cell systems, it is suboptimal to choose the receive filter. Thus, the feedback direction, i.e., PMI feedback, is based only on the signal space.

One difference between LTE Rel-11 MMSE-IRC receiver and a receiver that would carry out the previous steps 1 through 3 is that Rel-11 requirements mandate the use of a blind interference covariance estimator (e.g., based on first computing the residual signal based on DM-RS resource elements and then computing the sample covariance matrix in the subband of interest) while in the receiver of steps 1 through 3 the interference covariance is estimated parametrically by estimating the interference channel matrix and then making some assumptions on the statistical properties of the neighbor cell precoding matrix.

Other PMI selection criteria can be adapted to take into account MMSE-IRC receiver for Rel-11 or DIA. Some examples are:

Max-Min Criterion: For this approach, the selection criterion $$P_k = \arg\max_{P \in CB} \lambda_{min}(H_k P)$$

can be modified to $$P_k = \arg\max_{P \in CB} \lambda_{min}(R_{z_k}^{-1/2} H_k P).$$

Chordal Distance: For this approach, the selection criterion $$P_k = \arg\min_{P \in CB} \frac{1}{2} \| H_k^H H_k - P P^H \|$$

can be replaced with $$P_k = \arg\min_{P \in CB} \frac{1}{2} \| H_k^H R_{z_k}^{-1} H_k - P P^H \|_2.$$

Fubini Distance: For this approach, the selection criterion $$P_k = \arg\min_{P \in CB} \arccos |U_{0,k}^H P|$$

where $U_{0,k}^H$ is a matrix that comprises the eigenvectors of $H_k^H H_k$ can be replaced with $$P_k = \arg\min_{P \in CB} \arccos |U_k^H P|.$$

Two methods for codeword search that take the interference covariance structure into account can be envisioned. In one method, the columns from rank 1-2 or rank 1-4 precoders are pooled together as rank 1 vectors, and the vector from this pooled rank 1 codebook that has the smallest Euclidean distance (or equivalently, the largest inner product) with respect to the principal eigenvector of $H_k^H H_k$ is selected for feedback. If rank 1-2 codebooks are used, there are potentially 32 rank 1 vectors with Rel-8 4Tx codebooks. If rank 4 codebook is used, there are potentially 64 rank 1 vectors if Rel-8 4Tx codebook is used. This approach results in better spatial resolution relative to, say, just using the rank 1 codebook, which has only 16 vectors. This method can be easily adapted to finding the precoding vector that has the smallest Euclidean distance relative to the dominant eigenvector of $H_k^H R_{z_k}^{-1} H_k$. In other words, the network or UE can implement the following steps:

1. The eNB RRC configures the UE within a CSI process to feed back either SU-MIMO PMI/CQI/RI or rank 1 PMI using rank 2/3/4 codebook columns as its search space.

2. For the latter approach, the UE can for example feed back the index (rank index and codebook index) that corresponds to the vector that maximizes trace($p^H H_k^H R_{z_k}^{-1} H_k p$) or the vector (normalized to an unit vector) that is closest to the principal eigenvector of $R_{H_k} = H_k^H R_{z_k}^{-1} H_k$.

A second method for successively encoding the primary direction vector and the residual error vector was discussed above. This second method can be used for encoding the principal eigenvector of $R_{H_k} = H_k^H R_{z_k}^{-1} H_k$ in a multi-resolution encoding fashion. Under the second method, the UE can implement the following steps:

1. UE first finds the vector $p = \hat{p}_k$ that maximizes trace($p^H H_k^H R_{z_k}^{-1} H_k p$) or the vector that is closest to the principal eigenvector $v_k$ of $R_{H_k} = H_k^H R_{z_k}^{-1} H_k$ from rank 1 codebook.

2. UE finds the residue vector $e_k := v_k - \hat{p}_k$ and encodes it using norm and direction quantization. The direction quantization can use vectors from the rank 1 codebook that are (quasi-)orthogonal to the chosen $\hat{p}_k$.

One problem with using the existing Rel-8/10/12 codebooks for error vector is that these codebooks are optimized for SU-MIMO primary direction feedback and not for error vector feedback. Once the primary direction vector is chosen, the error vector resides in the subspace orthogonal to the primary direction vector.

Consider two unit vectors $u_1$ and $u_2$ that belong to $C^{M-1}$ which is the (M-1)-dimensional complex-valued vector space. The angle between the two vectors is defined through $\cos\theta = |u_2^H u_1|$ and the chordal distance as $d_c(u_1, u_2) = \sin\theta = \sqrt{1 - |u_2^H u_1|^2}$. Suppose that we transform the unit vectors by a Mx(M-N) matrix P with orthonormal rows and N<M such that $u'_1 = Pu_1$ and $u'_2 = Pu_2$. The inner product between the transformed vectors is identical to that between the original vectors because $u'_2{}^H u'_1 = u_2^H P^H P u_1 = u_2^H u_1$. Therefore, the chordal distance does not change under a semi-unitary transformation that maps a vector into a higher dimensional space.

Once the Mx1 principal vector direction p is chosen, the space orthogonal to the principal direction is given by the projection matrix $Z = I - pp^H$. Assuming that the error vector $e = v - p$ has an isotropic distribution in the subspace orthogonal to p, a B-bit codebook with elements with maximal pair-wise chordal distance appears to be optimal. Although codebooks designed for maximizing SU-MIMO link throughput (Rel-8 4Tx, Rel-10 8Tx, Rel-12 4Tx) do not have this directional property, one can start with a codebook that is optimal in the sense of possessing pair-wise maximal chordal distance in a (M-1)-dimensional space and use a distance-preserving transformation based on Z for obtaining a codebook in the M-dimensional space with the same distance spectrum.

According to an embodiment, the present disclosure defines a reduced-rank matrix square root decomposition of the projection matrix Z as $Z = L_Z L_Z^H$, where $L_Z$ is a Mx(M-1) non-singular (i.e., rank [M-1]) matrix with orthonormal columns.

Suppose that $\{u_1, u_2, \ldots, u_{2^B}\}$ is a B-bit codebook in the (M-1)-dimensional space with maximal pair-wise chordal distance. Forming a new codebook $\{L_Z u_1, L_Z u_2, \ldots, L_Z u_{2^B}\}$ in the M-dimensional space maintains the optimal distance property and simultaneously yields a codebook in the space orthogonal to p. Therefore, once a UE chooses a dominant signal direction vector (rank 1 vector or the column of the rank 2 precoder that corresponds to the larger of the two CQIs), it generates a complementary codebook in the space orthogonal to the dominant signal direction. The complementary codebook is based on a codebook that has optimal distance properties in a lower dimensional space. The UE uses the transformed codebook for error vector feedback.

Some current schemes use optimal line packings in the Grassmannian manifold and the theory of Fourier frames for numerically obtaining codebook constructions that are optimal in the chordal distance sense. In these proposals, a DFT basis set is used for selecting the codewords. LTE for Rel-10 8Tx and Rel-12 4Tx describes these current schemes (using oversampled DFT) in the context of dual codebook construction.

The present disclosure shows two example codebook constructions in the (M-1)-dimensional space.

According to one embodiment, a UE takes the following approach for constructing codewords with good distance properties in the (M-1)-dimensional space. Supposing that B-bits are available for feedback, one can form an oversampled DFT matrix of the form:

$$[W]_{(m,n)} = e^{j2\pi(m-1)(n-1)/Q}$$

where $Q = K2^B$ and K is a positive integer (the DFT oversampling factor). One can select (M-1) rows $\{r_1, \ldots, r_{M-1}\}$ and $2^B$ columns $\{c_1, \ldots, c_2{}^B\}$ to form a (M-1)-dimensional codebook X with $2^B$ entries. The set of rows and columns can be chosen to maximize the minimum pair-wise chordal distance to form the codebook X.

For example, for the LTE 4Tx case (M=4), one can obtain line packings in a complex-valued 3-dimensional space and use the projection approach outlined earlier to obtain optimal codewords for error vector encoding.

Through numerical search we find the optimal (M-1)=3-dimensional codebook based on DFT basis matrix (K=1 or no-oversampling) for 3-bit, 4-bit, and 5-bit feedback. The rows selected from the DFT matrix and the minimum distance between any two codewords in the codebook are shown in Table 1.

TABLE 1

| Minimum distance for different number of feedback bits | | |
|---|---|---|
| Number of bits (B) | Minimum distance | Selected rows |
| 3 | 0.817 | [2 3 5] |
| 4 | 0.459 | [2 6 11] |
| 5 | 0.341 | [1 2 7] |

Since the error vector does not have any preferred directionality, another option would be use optimal line packings in $C^3$, i.e., 3-dimensional complex-valued vector space. Once such packing for (M-1)=3 dimensions is determined through numerical search and presented for the B=2 bits and B=3 bits. The codewords for the 2-bit and 3-bit cases respectively are the 4 and 8 columns of the matrices $A_2$ and $A_3$ shown below. For the 2-bit case, the line packing is optimal as the minimum distance is equal to the theoretical minimum distance:

$$A_2 = \begin{bmatrix} 1/\sqrt{3} & j/\sqrt{3} & -1\sqrt{3} & -j/\sqrt{3} \\ 1/\sqrt{3} & -1\sqrt{3} & 1/\sqrt{3} & -1\sqrt{3} \\ 1/\sqrt{3} & -j/\sqrt{3} & -1\sqrt{3} & j/\sqrt{3} \end{bmatrix}$$

$$A_3 = \begin{bmatrix} 1/\sqrt{2} & 1/\sqrt{2} & 0 & e^{j2\pi/3}/\sqrt{2} & e^{j2\pi/3}/\sqrt{2} & e^{j4\pi/3}/\sqrt{2} & e^{j4\pi/3}/\sqrt{2} & 0 \\ 1/\sqrt{2} & 0 & 1/\sqrt{2} & e^{j4\pi/3}/\sqrt{2} & 0 & 0 & e^{j2\pi/3}/\sqrt{2} & e^{j4\pi/3}/\sqrt{2} \\ 0 & 1/\sqrt{2} & 1/\sqrt{2} & 0 & e^{j4\pi/3}/\sqrt{2} & e^{j2\pi/3}/\sqrt{2} & 0 & e^{j2\pi/3}/\sqrt{2} \end{bmatrix}$$

A unitary transformation of the codebook leads to another codebook with the same distance spectrum. For other values of M and B, one can use similar numerical searches to determining good line packings.

To provide feedback according to one embodiment, the UE carries out the following steps:

1. Find a rank 1 or rank 2 PMI based on the signal channel matrix and interference covariance matrix. Suppose that p is the desired quantized direction (based on a codebook) and v is the unquantized direction: for rank 1, p is the desired PMI and for rank 2, p corresponds to the direction (normalized unit vector) which corresponds to the larger CQI.

2. Define the error vector as e=v−p.

3. Obtain an orthonormal basis $L_Z$ for the projection matrix $Z=I−pp^H$. Find the (M−1)-dimensional vector $\hat{u}$ from the codebook C (e.g., oversampled DFT codebook) with the minimum Euclidean distance such that $$\hat{u} = \underset{u \in C}{\mathrm{argmin}} \|e - L_z u\|_2.$$

Send a B-bit feedback representing $\hat{u}$.

Figure 3:
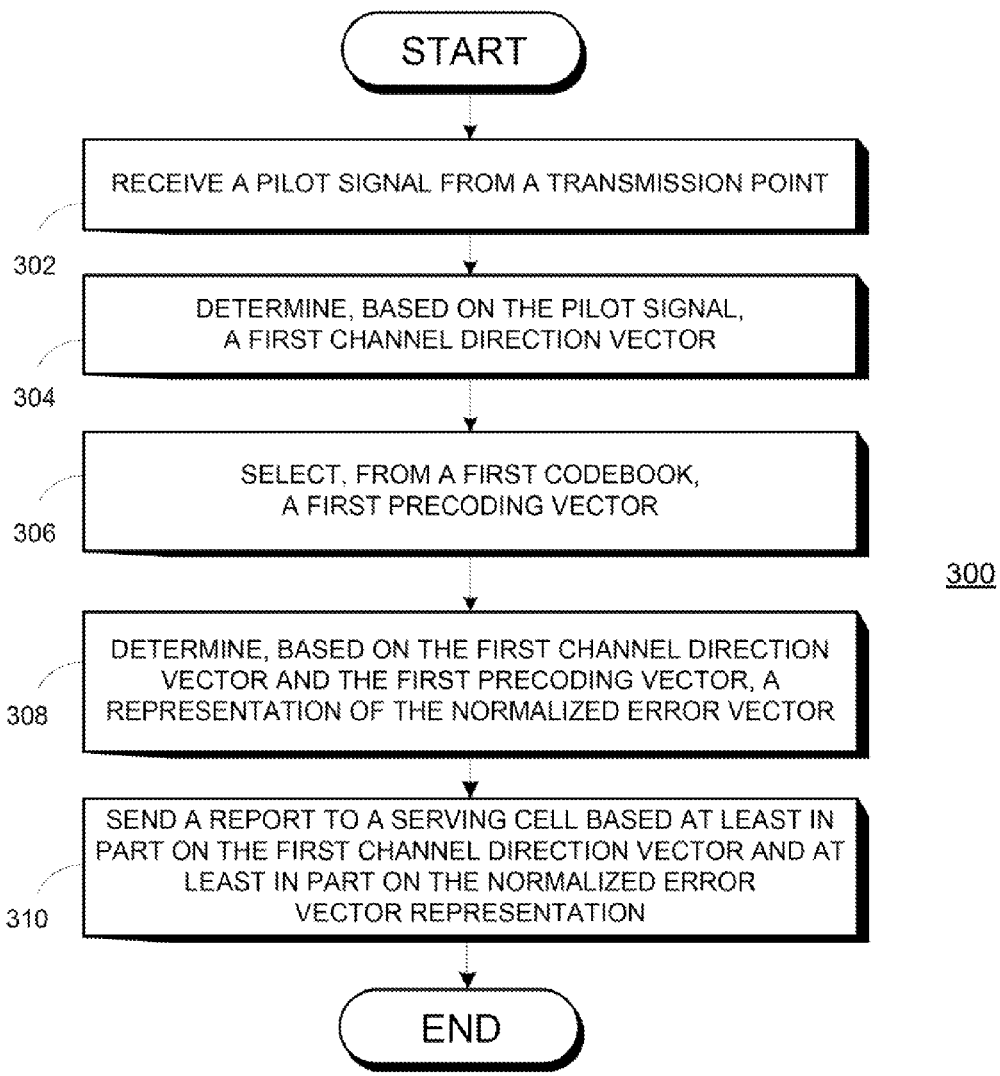
FIG. 3, FIG. 4, and FIG. 5 are flowcharts showing procedures carried out according to embodiments of the disclosure.

Turning to FIG. 3, to provide feedback according to one embodiment, the UE carries out the following steps. At step 302, the UE receives a pilot signal from a transmission point. At step 304, the UE determines, based on the pilot transmission, a first channel direction vector. At step 306, the UE selects, from a first codebook, a first precoding vector. At step 308, the UE determines, based on the first channel direction vector and the first precoding vector, a representation of the normalized error vector. At step 310, the UE sends a report to a serving cell based at least in part on the first channel direction vector and at least in part on the normalized error vector representation.

Figure 4:
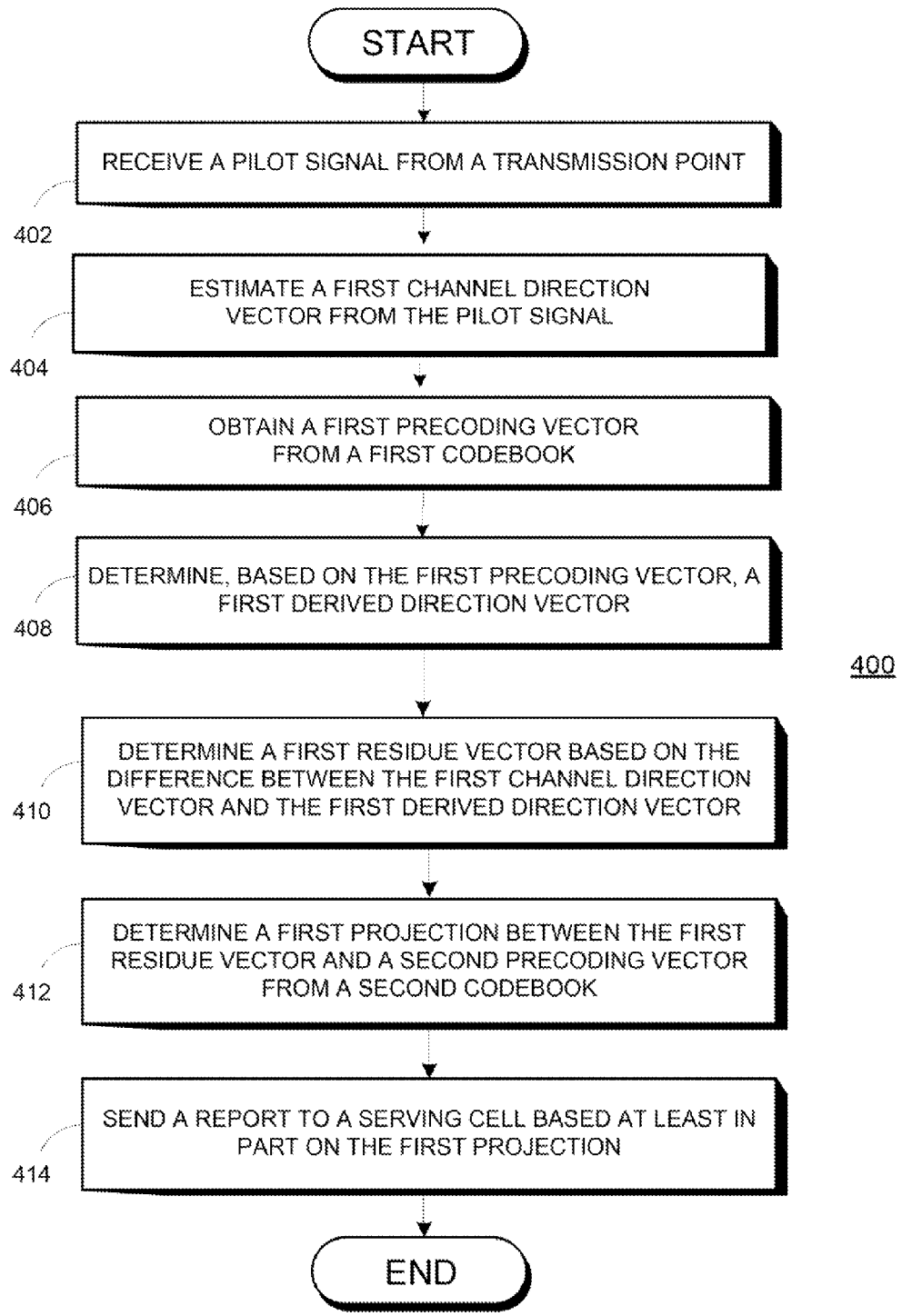

Turning to FIG. 4, the UE carries out the following steps in order to provide feedback in another embodiment. At step 402, the UE receives a pilot signal from a transmission point. At step 404, the UE estimates a first channel direction vector from the pilot signal. At step 406, the UE obtains a first precoding vector from a first codebook. At step 408, the UE determines, based on the first precoding vector, a first derived direction vector. At step 410, the UE determines first residue vector based on the difference between the first channel direction vector and the first derived direction vector. At step 412, the UE determines a first projection between the first residue vector and a second precoding vector from a second codebook. At step 414, the UE sends a report to a serve cell based at least in part on the first projection.

Figure 5:
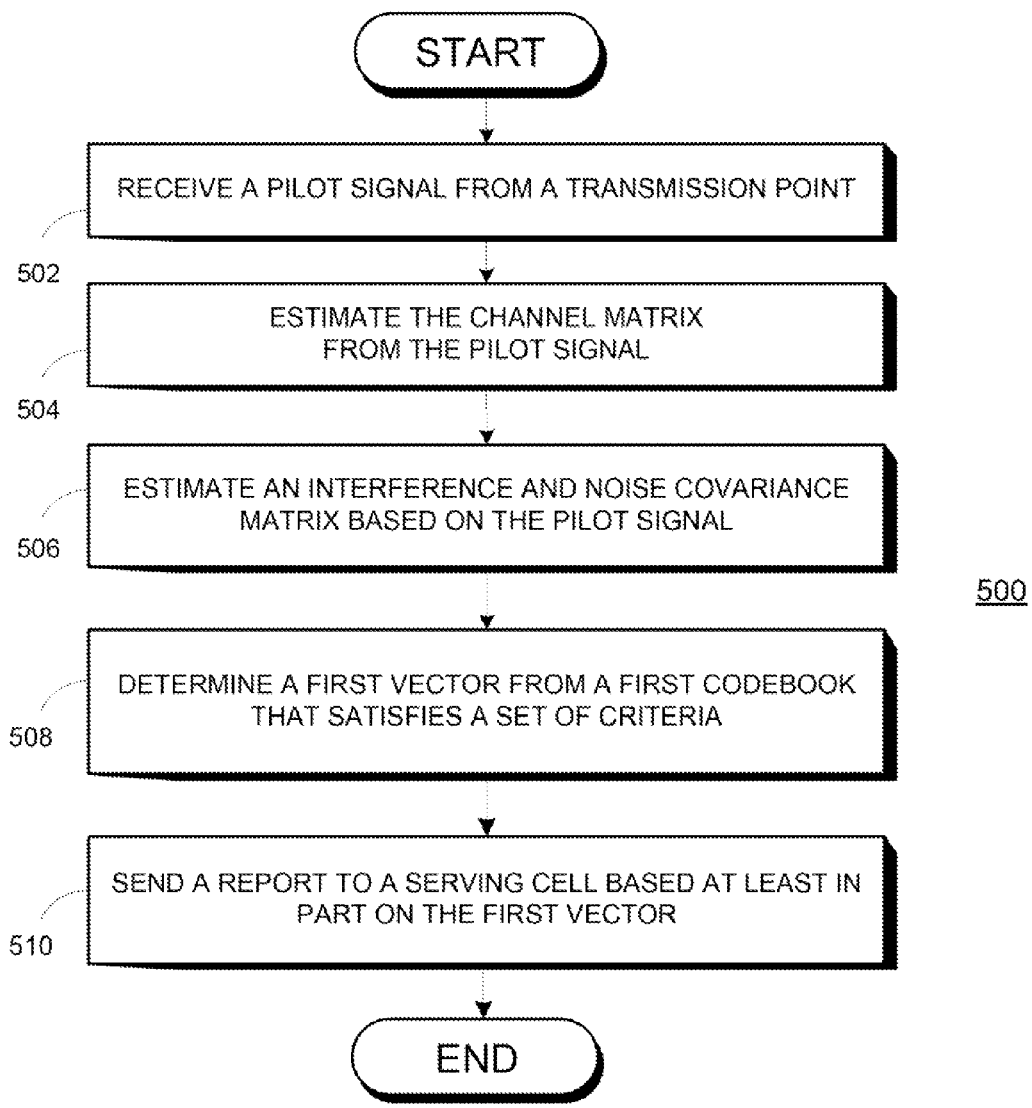

Turning to FIG. 5, to provide feedback according to one embodiment, the UE carries out the following steps: At step 502, the UE receives a pilot signal from a transmission point. At step 504, the UE estimates the channel matrix based on the pilot transmission. At step 506, the UE estimates an interference and noise covariance matrix based on the pilot signal. At step 508, the UE determines a first vector from a first codebook that satisfies a set of criteria. At step 510, the UE sends a report to a serving cell based at least in part on the first vector.

According to an embodiment, the first direction vector can be at least partially represented by a first index ($i_1$), while the error vector or the normalized error vector can be at least partially represented by a second index ($i_2$). The error norm (or more accurately the residual error norm) can be at least partially represented by a first CQI. The error norm can also be at least partially represented by a channel quality offset indicator, which itself is represented by a third index $q_1$. The first index ($i_1$), the second index ($i_2$), and the third index ($q_1$) form a complete representation of the refined channel direction vector.

In one embodiment, the second index ($i_2$) and the third index ($q_1$) are jointly encoded into a new second index ($i'_2$). In this embodiment, the first index points to an element of a first codebook, while the second index points to an element of a second codebook.

In one embodiment, both the first index and the second index are determined under the assumption that transmission occurs over the entire bandwidth.

In an alternative embodiment, the first index is determined assuming that transmission occurs over the entire bandwidth, while the second index is determined assuming that transmission occurs on a subband (the subband being a portion of the entire transmission bandwidth).

In one embodiment, the UE is configured with a CSI process for generating CSI feedback. The CSI process is associated with the generation of one set of CSI, which can include PMI, RI, or CQI. The CSI process is associated with one or more CSI-RS resources (for which the UE assumes non-zero transmission power for the CSI-RS) and one or more interference measurement resources.

In an embodiment, the PMI corresponds to the first index ($i_1$) or the second index ($i_2$). Each CSI-RS resource is associated with one or more CSI-RS antenna ports. Each CSI-RS antenna port is associated with one or more antenna elements of an antenna array.

In one embodiment, the UE determines the RI, CQI, the first index ($i_1$), the second index ($i_2$), and the third index ($q_1$) based on the CSI-RS received on the CSI-RS antenna ports associated with the CSI-RS resource or resources that are associated with the CSI process. The PMI is conditioned on the most recent RI. Thus, the first index ($i_1$), the second index ($i_2$), and the third index ($q_1$) are conditioned on the most recent RI. The CQI is conditioned on the most recent PMI.

In an embodiment, the UE is configured with periodic CSI reporting. In one example, the UE is configured with two reporting instances—a first reporting instance and a second reporting instance—each with its own periodicity—a first periodicity and a second periodicity—for reporting on a set of CSI (made up of CQI/PMI/RI). In one implementation, the first reporting instance is in a first uplink subframe, and the second reporting instance may be in a second uplink subframe. The first uplink subframe and the second uplink subframe can occur at different times. The first and second periodicities may be different.

In one example, the UE is configured for wideband CQI or wideband PMI periodic reporting. In one mode of operation, the UE transmits a first CSI report, which includes RI and a first PMI—the first PMI being a representation of the first index ($i_1$)—on the first reporting instance with the first periodicity. The RI and the first PMI may be separately encoded (e.g., mapped to different set of bits in a message) or jointly encoded. In some cases, the first index ($i_1$) is sub-sampled (i.e., only certain specified values or a subset of the possible values are available to select from) to fit within the available number of bits for the first CSI report. The UE transmits a second CSI report that includes the wideband CQI and second PMI—the second PMI being a representation of the second index ($i_2$)—on the second reporting instances with the second periodicity. The wideband CQI and the second PMI may be separately or jointly encoded.

In an alternative implementation, the UE transmits a second CSI report that includes the wideband CQI and second PMI—the second PMI being a representation of the second index ($i_2$)—on the second reporting instance with the second periodicity. The wideband CQI and second PMI may be separately or jointly encoded. In some cases, the first codebook index ($i_1$) or the second codebook index ($i_2$) is sub-sampled (i.e., only certain specified values or a subset of the possible values are available to select from) to fit within the available number of bits for the second CSI report.

In another mode of operation, the UE transmits a first CSI report including RI on the first reporting instance with the first periodicity. The UE transmits a second CSI report that includes the wideband CQI and PMI—the PMI being a representation of the first index ($i_1$) the second index ($i_2$) and the third index ($q_1$)—on the second reporting instance with the second periodicity. The wideband CQI and the PMI may be separately or jointly encoded. In some cases, the first index ($i_1$), the second index ($i_2$), and the third index ($q_1$) are sub-sampled (i.e., only certain specified values or a subset of the possible values are available to select from) to fit within the available number of bits for the second CSI report.

In one embodiment, the eNB signals, to the UE, an operation mode from a set of modes (including one or more of the modes described above). The different modes can exploit different feedback rates described and trade off the subsampling impacts of the codebook indices and provide mechanisms to minimize the uplink overhead for CSI feedback.

In another example, the UE is configured for suband CQI/PMI periodic reporting. In one mode of operation, the UE determines a Precoder Type Indicator ("PTI") and transmits a first CSI report that includes RI and the PTI on the first reporting instances with the first periodicity. The RI and the PTI may be separately or jointly encoded. The UE uses the PTI to indicate the contents of the CSI reports on the second reporting instances with the second periodicity until the next RI+PTI report. If the most recent transmitted PTI is set to '0' (first state), the UE transmits a second CSI report on a subset of the second reporting instances and does so with a third periodicity (e.g., third periodicity=k*second periodicity, k being an integer). If the most recent transmitted PTI is set to '0', the second CSI report includes a first PMI, the first PMI being a representation of the first index ($i_1$). Between every two consecutive first/second PMI reports on the second reporting instances with the second periodicity, the UE transmits a third CSI report including a wideband CQI and a second PMI assuming transmission on a wideband channel bandwidth, the second PMI being a representation of the second index ($i_2$). In case of CSI report collision due to UE configured with multiple carriers (carrier aggregation) or multiple serving cells, the UE transmits a CSI report of only one serving cell with the CSI report including only the representation of the first index ($i_1$) having higher priority than other CSI reports including at least CQI which are dropped.

If the most recent transmitted PTI is set to '1' (second state), the UE transmits the second CSI report on a subset of the second reporting instances with a fourth periodicity (e.g., fourth periodicity=m*second periodicity, m being an integer), the second CSI report including the wideband CQI and the third PMI, the third PMI being a representation of the second index ($i_2$) assuming transmission on a wideband channel bandwidth. The fourth periodicity can be different than the third periodicity. Between every two consecutive wideband CQI/wideband second PMI reports on the second reporting instances with the second periodicity, the UE transmits a fourth CSI report that includes a subband CQI and a fourth PMI assuming transmission on a subband channel bandwidth, the fourth PMI being a representation of the second index ($i_2$). Thus, with the use of PTI, in scenarios where first index ($i_1$) is not changing, subband feedback of the second index ($i_2$) and associated CQI can be achieved which can improve UE throughput performance.

In an alternate example, if the most recent transmitted PTI is set to '0' (first state) the UE 110 transmits a second CSI report on a subset of the second reporting instances with a third periodicity (e.g., third periodicity=k*second periodicity, k being an integer). The second CSI report includes a first PMI, the first PMI being a representation of the first index ($i_1$). Between every two consecutive first and second PMI reports on the second reporting instances with the second periodicity, the UE transmits a third CSI report including a wideband CQI and a second PMI assuming transmission on a wideband channel bandwidth, the second PMI being a representation of the second index ($i_2$). The UE behavior if the most recent transmitted PTI is set to '1' (second state) is the same as described in the previous mode of the operation above. In case of CSI report collision due to UE configured with multiple carriers (carrier aggregation) or multiple serving cells, the UE transmits a CSI report of only one serving cell with the CSI report including the representation of the first index ($i_1$) that has higher priority than other CSI reports including at least CQI which are dropped.

Although the various embodiments are frequently described in the context of an LTE cellular system, it is to be understood that the scope of the disclosure is not limited to LTE and may be implemented in other types of wireless networks (IEEE 802.11, 802.16, etc.).

In view of the many possible embodiments to which the principles of the present discussion may be applied, it should be recognized that the embodiments described herein with respect to the drawing figures are meant to be illustrative only and should not be taken as limiting the scope of the claims Therefore, the techniques as described herein contemplate all such embodiments as may come within the scope of the following claims and equivalents thereof.

I claim:

1. A method comprising:
   receiving a pilot signal from a transmission point;
   determining, based on the pilot signal, a first channel direction vector v of size M×1;
   selecting, from a first codebook, a first precoding vector p, wherein p is a representation of v;
   determining, based on v and on p, a representation $L\hat{u}$ of the normalized error vector $\tilde{e}$, wherein:
   $\tilde{e} = (v-p)/\|v-p\|_2$,
   $\hat{u}$ a (M−1)×1 vector from a second codebook C, and
   L is a matrix with (M−1) columns that are orthogonal to p; and
   sending a report to a serving cell based at least in part on p and at least in part on $\hat{u}$.

2. The method of claim 1:
wherein C comprises a set of codewords;
wherein the set of codewords is not equal to a set of elements $$\sum_{j=1}^{M-1} \alpha_j e_j;$$

wherein $\alpha_j$ is a real or complex-valued number that is drawn from a set $\{q_1, q_2, \ldots, q_{2^B}\}$ for some positive integer B; and
wherein $e_j$ is a selection vector with the j-th element equal to 1 and with each of the remainder of the elements of $e_j$ equal to 0.

3. The method of claim 1 wherein $$\hat{u} = \underset{u \in C}{\operatorname{argmin}} \|e - Lu\|.$$

4. The method of claim 1 wherein L is an orthonormal basis matrix for the projection matrix $I - pp^H$.

5. The method of claim 1:
wherein C is based on line packing in $C^{M-1}$; and
wherein M is the dimension of v.

6. The method of claim 1 wherein C is based on a Discrete Fourier transform basis matrix.

7. The method of claim 1 further comprising:
determining a first derived direction vector $\bar{v}_{k,1}$ based on p;
determining a first residue vector $\tilde{e}_{k,1}$ based on $p - \bar{v}_{k,1}$;
determining a first projection $\tilde{e}_{k,1}^H \bar{v}_{l,1}$ between $\tilde{e}_{k,1}$ and $\bar{v}_{l,1}$; and
sending a report to the serving cell based at least in part on $\tilde{e}_{k,1}^H \bar{v}_{l,1}$.

8. The method of claim 1 wherein the report is a channel state information report.

9. The method of claim 8 wherein the channel state information report includes a rank indication for one or more spatial layers or a channel quality indication applicable to p.

10. The method of claim 1 wherein sending a report to a serving cell comprises:
sending a first channel state information report that includes a representation of p in a first uplink subframe; and
sending a second channel state information report that includes a representation of $\hat{u}$ in a second uplink subframe.

11. The method of claim 10 wherein the first uplink subframe occurs at a different time from the second uplink subframe.

12. The method of claim 10 wherein the first channel state information report and the second channel state information report are transmitted periodically.

13. The method of claim 12 wherein the first channel state information and the second channel state information report are transmitted with different periodicities.

14. The method of claim 10 wherein the uplink subframe is one of a physical uplink shared channel and a physical uplink control channel.

15. The method of claim 1 wherein the pilot signal is a channel state information reference signal.

16. The method of claim 15 further comprising receiving a configuration signal indicating one or more of a number of antenna ports, a periodicity, and a subframe offset applicable to the channel state information reference signal.

17. The method of claim 1 wherein the pilot signal is a cell-specific reference signal.

18. A method comprising:
receiving a pilot signal from a transmission point;
estimating a first channel direction vector $v_{k,1}$ from the pilot signal;
obtaining a first precoding vector $\bar{v}_{k,1}$ from a first codebook;
determining, based on $v_{k,1}$, a first derived direction vector $\bar{\bar{v}}_{k,1}$;
determining a first residue vector $\tilde{e}_{k,1}$ based $v_{k,1} - \bar{\bar{v}}_{k,1}$;
determining a first projection $\tilde{e}_{k,1}^H \bar{\bar{v}}_{l,1}$, between $\tilde{e}_{k,1}$ and a second precoding vector $\bar{\bar{v}}_{l,1}$ from a second codebook; and
sending a report to a serving cell based at least in part on $\tilde{e}_{k,1}^H \bar{\bar{v}}_{l,1}$.

19. The method of claim 18 wherein the first codebook is the same as the second codebook.

20. The method of claim 18:
wherein $\bar{\bar{v}}_{k,1} := \operatorname{norm}(\bar{v}_{k,1} + \bar{r}_{k,1} \bar{t}_{k,1})$;
wherein norm $(x) := x / \|x\|_2$;
wherein $\bar{r}_{k,1}$ is norm of the difference vector $v_{k,1} - \bar{v}_{k,1}$; and
wherein $\bar{t}_{k,1}$ is a unit vector.

21. The method of claim 18 wherein sending the report to the serving cell comprises determining a first angle based on $\tilde{e}_{k,1}^H \bar{\bar{v}}_{l,1}$.

22. The method of claim 21 further comprising:
estimating a second channel direction vector $v_{k,2}$ from the pilot signal;
obtaining a second precoding vector $\bar{v}_{k,2}$ from the first codebook;
determining, based on $\bar{v}_{k,2}$, a second derived direction vector $\bar{\bar{v}}_{k,2}$;
determining a second residue vector $\tilde{e}_{k,2}$ based on $v_{k,2} - \bar{\bar{v}}_{k,2}$;
determining a second projection $\tilde{e}_{k,2}^H \bar{\bar{v}}_{l,1}$ between $\tilde{e}_{k,2}$ and a second precoding vector $\bar{\bar{v}}_{l,1}$ from a second codebook; and
sending a report to a serving cell based at least in part on $\tilde{e}_{k,2}^H \bar{\bar{v}}_{l,1}$.

23. A method comprising:
receiving a pilot from a transmission point;
estimating the channel matrix $H_k$ from the pilot;
estimating an interference and noise covariance matrix $R_{z_k}$ based on the pilot signal;
determining a first vector p from a first codebook that satisfies at least one of the following criteria:
maximize trace $(p^H H_k^H R_{z_k}^{-1} H_k p)$; and
minimize the Euclidean distance $\|v - p\|_2$, where v is the principal eigenvector of $H_k^H R_{z_k}^{-1} H_k$; and
sending a report to a serving cell based at least in part on p.

24. The method of claim 23 further comprising determining the first vector p from the first codebook if the pilot signal to noise ratio is below a first threshold.

25. A UE comprising:
a processor;
a plurality of transceivers; and
an antenna array including a plurality of antennas, wherein each antenna is connected to at least one of the plurality of transceivers;
wherein the UE receives a radio frequency pilot signal from a transmission point via the antenna array;
wherein one or more of the plurality of transceivers converts the pilot signal to digital signals and provides the digital signals to the processor; and wherein the processor performs steps comprising:
  determining, based on the pilot signal, a first channel direction vector v of size M×1;
  selecting, from a first codebook, a first precoding vector p, wherein p is a representation of v;
  determining, based on v and on p, a representation L$\hat{u}$ of the normalized error vector $\tilde{e}$, wherein:
    $\tilde{e}=(v-p)/\|v-p\|_2$,
    $\hat{u}$ a (M−1)×1 vector from a second codebook C, and
    L is a matrix with (M−1) columns that are orthogonal to p; and
  sending, via at least one of the plurality of transceivers and via the antenna array, a report to a serving cell based at least in part on p and at least in part on $\hat{u}$.

* * * * *

UNITED STATES PATENT AND TRADEMARK OFFICE
CERTIFICATE OF CORRECTION

PATENT NO. : 9,042,476 B2
APPLICATION NO. : 14/034828
DATED : May 26, 2015
INVENTOR(S) : Sandeep H. Krishnamurthy Page 1 of 1

It is certified that error appears in the above-identified patent and that said Letters Patent is hereby corrected as shown below:

In the Claims:

Claim 22, line 37 please replace "$\tilde{c}_{k2}$" with --$\tilde{c}_{k,2}$--.

Signed and Sealed this
Thirteenth Day of October, 2015

Michelle K. Lee
*Director of the United States Patent and Trademark Office*